United States Patent
Crosby

(10) Patent No.: US 12,434,905 B1
(45) Date of Patent: Oct. 7, 2025

(54) ENHANCED INTERMODAL CONTAINER MODIFICATION KIT

(71) Applicant: Lon Owen Crosby, Webster City, IA (US)

(72) Inventor: Lon Owen Crosby, Webster City, IA (US)

(*) Notice: Subject to any disclaimer, the term of this patent is extended or adjusted under 35 U.S.C. 154(b) by 202 days.

(21) Appl. No.: 18/376,099

(22) Filed: Oct. 3, 2023

Related U.S. Application Data

(60) Provisional application No. 63/576,796, filed on Mar. 6, 2023.

(51) Int. Cl.
*B65D 88/74* (2006.01)
*B65D 81/20* (2006.01)
*B65D 81/24* (2006.01)

(52) U.S. Cl.
CPC ....... *B65D 88/745* (2013.01); *B65D 81/2076* (2013.01); *B65D 81/24* (2013.01)

(58) Field of Classification Search
CPC .. B65D 81/2076; B65D 81/24; B65D 88/745; B65D 90/06
USPC ............... 206/213.1, 223; 414/354
See application file for complete search history.

(56) References Cited

U.S. PATENT DOCUMENTS

| | | | | |
|---|---|---|---|---|
| 6,085,664 A * | 7/2000 | Early | ........... | B65D 90/10 105/377.07 |
| 6,627,434 B1 * | 9/2003 | McNelly | ........... | C05F 17/70 435/290.1 |
| 7,244,087 B2 * | 7/2007 | Wilson | ........... | B65D 88/66 414/415 |
| 9,233,791 B2 * | 1/2016 | Bushnell | ........... | B65D 90/06 |
| 2006/0118504 A1 * | 6/2006 | Willemsen | ........... | B65D 90/0053 211/189 |
| 2012/0073322 A1 * | 3/2012 | Bushnell | ........... | B65D 90/06 165/59 |
| 2018/0327179 A1 * | 11/2018 | Papas | ........... | B65D 90/008 |
| 2024/0343464 A1 * | 10/2024 | Crouthamel | ........... | B65D 81/24 |

* cited by examiner

*Primary Examiner* — Luan K Bui
(74) *Attorney, Agent, or Firm* — Law Office of Steven C Wichmann; Steven C Wichmann

(57) ABSTRACT

A kit for temporarily modifying an intermodal container for aerating an interior thereof with a fluidic gas to maintain quality characteristics of bulk material contents comprises a gas delivery apparatus having an inlet for the intake of a fluidic gas and having an outlet for delivering the fluidic gas. A plenum interface is in fluidic communication with the gas delivery apparatus and with a plurality of aeration floor panels sized to cover a floor of the container when placed adjacent one to the others. Each panel defines a plurality of apertures therethrough and further define a plurality of longitudinally extending air channels therealong collectively defining a plenum. The apertures facilitate transfer of the fluidic gas from the air channels through the apertures to the interior of the intermodal container.

20 Claims, 4 Drawing Sheets

ENHANCED INTERMODAL CONTAINER MODIFICATION KIT

CROSS-REFERENCE TO RELATED APPLICATION

This Non-Provisional Utility application claims the benefit of U.S. Provisional Patent Application Ser. No. 63/576,796, filed on Mar. 6, 2023, which is incorporated herein in its entirety.

FIELD OF THE INVENTION

The present disclosure generally relates to apparatuses and methods for the shipment of grain and other biological materials. More particularly, the present disclosure relates to an aeration system for treating grains while contained in an intermodal container to prevent degradation of or to enhance the grain quality.

BACKGROUND OF THE INVENTION

The development of intermodal containers for the transport of grain and other biological materials has significantly changed the transportation marketplace locally, regionally, nationally and internationally. Further, the use of intermodal containers for the storage as well as for the transport of grains in similar products, would fundamentally change the marketplace.

The concept of using an intermodal container to be used for both storage and transport merges perfectly with the concepts of value-added/source-identified products where traceability and objectively defined quality attributes represent defined value of the product produced. At the same time, this approach resolves well defined issues with product traceability in proposed systems like block-chain. By objectively defining the characteristics of the product being stored in the intermodal container, the content may be offered for sale via an electronic marketplace.

Use of an electronic marketplace has the potential to change the buying and selling of stored products. The technology allows individual growers to connect directly with end-users, both nationally and internationally. The approach also allows corporate entities involved in crop origination (such as plant genetics companies, etc.) to link with large end-users (food processors, animal feed companies, etc.).

In both situations, product is physically loaded into the container at or near the point of production and isn't physically handled again until it is unloaded from the container by the end-user. In comparison, the movement of product from the producer to the end-user using traditional bulk handing systems may involve over 200 separate steps (i.e., conveyor belts, augers, piling, large drops between process stems, temporary bin storage, drying, etc.) as the product moves systematically from on-farm storage to a local elevator to a regional elevator with barge or unit train loading facilities to an ocean port loading facility and onto an ocean carrier. At the destination port, the whole process is replicated as the product moves from the ship to a port elevator, to a regional elevator, to a local elevator, and finally to the end-user. Each of the individual steps has an objectively definable impact upon the quality attributes (and value) of the product being purchased. In addition, the bulk handling process subjects the entire product mass being moved to insects, environmental impacts (temperature and moisture), etc. which may be far more damaging to both quality and value than the physical handling process. With intermodal containers, problems may still occur because of mishandling of individual containers, but the problem's impact is limited to a single container. On the other hand, open storage guarantees exposure to dirt dust, air pollution, exposure to equipment operated by internal combustion engines, and other potential means of contamination.

The quality of grain being sold is typically based upon commercial standards (for example, #2 yellow corn by weight and moisture). This generic approach frequently masks the real value within a unit of product. There are functional tests (such as a falling number test to measure amylase activity) which can be performed on a representative sample(s). And there are tests for the presence of specific toxins such as aflatoxin, etc. These tests address specific issues without addressing broader issues related to product quality.

By linking the concept of value-added/source-identified crops with the use of intermodal containers, an alternative marketing scheme can be defined which has the potential to benefit everyone involved in the crop production scheme.

Units would be defined by net weight and quality attributes (moisture, nutrient levels, etc.) and be dependent upon the crop and market destination. By using a continuous hyperspectral analysis system (or similar sensing systems) which defines a continuous record of the material being loaded into an intermodal container, the record can be integrated over time/volume to create an integrated spectral signature. A potential purchaser (or anyone else in the system) can deconvolute this data to define value for their specific need. Using an identical hyperspectral imager to monitor the grain coming from a container during unloading can generate a second integrated signature which should match (within statistical limits). If not, there is a problem somewhere. It is noted that several companies are developing systems which can be incorporated into smartphones—a quick and easy way to assess food quality, etc.

The use of an intermodal container for storage makes it easy to deal with specific quality issues derived from harvest conditions and/or storage situations. Examples include the need to reduce the moisture content by drying, the need to rehydrate material for long-term storage, to deal with insects and microbes, to deal with residual chemicals, etc. Currently, bulk materials are processed, handled, and transported in large quantities thereby subjecting the materials to unnecessary damage and requiring the treatment of the materials to be across the entire bulk quantity.

Treating large bins (i.e., from 15,000 to 500,000 bushels of product) of stored product is typically difficult and expensive because the entire bin must be treated since it is typically impossible to treat a small section of a large bin. With intermodal containers, an entire bin may be 850 bushels or so. Low temperature drying of grain in large bins is impossible since it is physically impossible to move enough air through the bin to control endogenous heating, and spoilage conditions.

The use of intermodal containers for storage is constrained by the requirement that material being shipped is biologically stable. That is, have a grain moisture content which preludes endogenous heating, germination or the development of surface microbes which lead to decay and/or product degradation, At the same time, issues such as the development of insects or eggs and the resulting presence of undesirable contaminants such as aflatoxin must be addressed.

However, the shipping of bulk materials, especially biological materials such as grains and farm products are subject to damage and contamination through a multitude of handling processes and uncontrolled ambient conditions when transferred and transported in large open bins. Therefore, a system is needed whereby the bulk materials can be isolated into smaller containers where the ambient conditions are controlled, and spoilage is minimized, and the transporting and transferring of the materials is accomplished on a container by container basis.

SUMMARY OF THE INVENTION

The present disclosure is generally directed to a kit for temporarily modifying an intermodal container for aerating an interior thereof with a fluidic gas for maintaining quality characteristics of bulk material contents and comprises a gas delivery apparatus having an inlet for the intake of a fluidic gas and having an outlet for delivering the fluidic gas. A plenum interface is in fluidic communication with the gas delivery apparatus and with a plurality of aeration floor panels sized to cover a floor of the container when placed adjacent one to the others. Each panel defines a plurality of apertures therethrough and further define a plurality of longitudinally extending air channels therealong collectively defining a plenum. The apertures facilitate transfer of the fluidic gas from the air channels through the apertures to the interior of the intermodal container.

In another aspect, the aeration floor is a corrugated panel having two outer sheet layers separated by a central corrugated layer.

In still another aspect, the aeration floor comprises an extruded resin panel forming two outer sheets separated by a plurality of parallel webs extending longitudinally along the length of the panel, the outer sheets in combination with the parallel webs defining the plurality of air channels, the extruded panel further defining a plurality of linearly aligned apertures through one of the outer sheet layers and aligned along each of the air channels.

In yet another aspect, the apertures at a first end of the aeration floor panel have a smaller cross-sectional area than the apertures most distal from the first end of the plenum interface.

In a still further aspect, the apertures variably increase in cross-sectional area from the aperture most proximate to the aeration floor panel to the aperture most distal from the first end.

In another aspect, the gas delivery apparatus the gas delivery apparatus is adapted for installation at an inspection port of the intermodal container and the inlet of the gas delivery apparatus is communicative with a top portion of the intermodal container and the exhaust of the gas delivery apparatus is communicative with the plenum interface.

In another aspect, the gas delivery apparatus includes at least one ozone generator.

In a still further aspect, the kit includes a sensor system for monitoring quality characteristics of bulk contents of the intermodal container.

In yet another aspect, the sensor system is functional to monitor at least one of the quality characteristics group consisting of airflow, ambient air temperature, plenum air temperature, ambient air humidity, plenum air humidity, green temperature, green moisture, static air pressure in the plenum, ozone level in the plenum, ozone level in the top space, oxygen, and carbon dioxide.

In another aspect, the aeration kit further includes a porous blanket for covering the upper surface of the aeration floor panels to prevent portions of a bulk content of the intermodal container from blocking the aeration floor panel apertures.

In still another aspect, the fluidic gas delivered through the aeration floor panels is one of the gasses selected from a group consisting of ozone, propylene oxide, propylene chlorohydrin, propylene bromohydrin, hydrogen cyanide, sulfuryl fluoride, chlorpyrifos-methyl, deltamethrin, diacon II [(s-methoprene)], pirimiphos-methyl, pyrethrins, piperonyl butoxide, malathion, methyl bromide, phosphine, and/or heated or cooled air relative to the temperature of the container's contents.

In yet another aspect, a method for temporarily modifying an intermodal container for the shipment of bulk materials comprises the steps of acquiring a modification kit comprising a plurality of aeration floor panels, each panel defining a plurality of longitudinal air channels therealong wherein a top surface of each floor panel defines a plurality of apertures through an upper surface of the floor panel for gaseous communication from the air channel therethrough, a plenum interface, a gas distribution apparatus, an adapter plate having gas delivery conduits extending therethrough, and a sensor system for monitoring quality characteristics of bulk contents of the intermodal container. Then placing the aeration floor panels on the floor of the intermodal container abutting one to the others. Next, adhesive tape is applied over the joints of abutting floor panels. The plenum interface is placed at an end of the aeration floor panels most proximate to doors at one end of the intermodal container. The adapter plate is installed at an inspection port of a container door. One end of the gas delivery conduits is connected to the plenum interface and an opposite end of the gas delivery conduits is connected to the gas distribution apparatus. The sensor system is installed to a fill port at the top of the container. The container is filled with a bulk material and the quality characteristics of the bulk contents is monitored during container transport and storage. The container is emptied of the bulk material, and the modification kit is removed from the intermodal container.

In another aspect, the method for temporarily modifying an intermodal container further includes after the removing the modification kit step, the steps of returning the intermodal container to general use and returning the modification kit to the source of the bulk material for installation in a subsequent intermodal container.

In still another aspect, the method for temporarily modifying an intermodal container further includes after the removing the modification kit step, the steps of placing a plurality of modification kits in an intermodal container and shipping the intermodal container containing the plurality of modification kits back to the bulk material source for reuse in modifying subsequent intermodal containers.

In yet another aspect, a system for aerating an interior of an intermodal container with a fluidic gas to maintain quality characteristics of bulk material contents in the intermodal container includes a plurality of aeration floor panels defining a plurality of apertures therethrough and removably supported upon the floor of the intermodal container, the aeration floor panels also define a plurality of longitudinally extending air channels therealong. The apertures facilitate transfer of the fluidic gas from the air channels to the interior of the intermodal container. A plenum interface is located at one end of the intermodal container and is in fluidic communication with the air channels at a proximal end of the aeration floor. A gas delivery apparatus mounted external to the intermodal container and has an inlet for the intake of a fluidic gas from the top interior of the intermodal container and an outlet gaseously communicative with the plenum interface for delivering the fluidic gas to the aeration floor panels.

In a still further aspect, the aeration floor comprises an extruded resin panel forming two outer sheets separated by a plurality of parallel webs extending longitudinally along the length of the panel, the outer sheets in combination with the parallel webs defining the plurality of air channels, the extruded panel further defining a plurality of linearly aligned apertures through one of the outer sheet layers and aligned along each of the air channels.

In another aspect, the apertures most proximate to the plenum interface have a smaller cross-sectional area than the apertures most distal from the plenum interface.

In another aspect, the apertures variably increase in cross-sectional area from the aperture most proximate to the plenum interface to the aperture most distal from the plenum interface.

In a still further aspect, the gas delivery apparatus includes at least one ozone generator.

In yet another aspect, the aeration system further includes a sensor system for monitoring quality characteristics of bulk contents of the intermodal container, the quality characteristics being at least one of the group consisting of airflow, ambient air temperature, plenum air temperature, ambient air humidity, plenum air humidity, grain temperature, green moisture, static air pressure in the plenum, ozone level in the plenum, ozone level in the top space, oxygen, carbon dioxide.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

Figure 1:
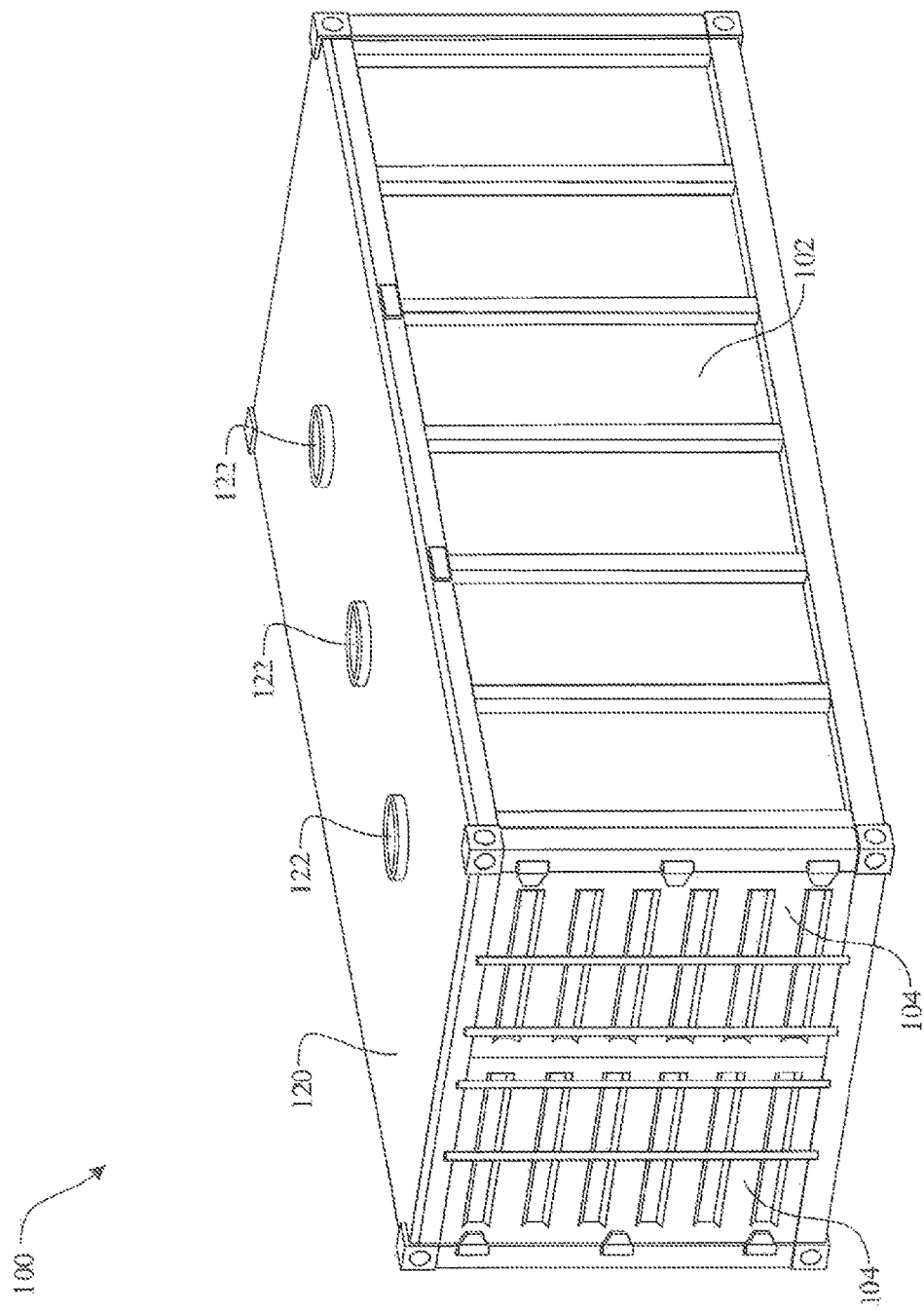
FIG. 1 presents an isometric view of an intermodal container utilized for the shipment of bulk materials such as agricultural grain.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The insertion of an aeration floor into a standard intermodal container designed for the transport of bulk commodities (such as grain, plastic pellets, fertilizers, etc.) is the underlying component that allows a standard intermodal container to be used for both storage and transport.

A simple and reasonably priced aeration floor could permit grain and similar materials with an elevated moisture level to be dried to a safe level in situ; permit grain and similar materials with a low moisture level to be rehydrated to a safe level in situ; permit grain and similar materials to be treated with insecticides in situ. The aeration floor would also permit grain and similar materials to be treated with, germination inhibitors, fungicides, bactericides, virucides (for such viruses as African Swine Fever) and other agents for maintaining the quality of the grain.

The system design and specifications for use of for the control of biological and chemical contaminants must be specified for international use, both in the country of origin and the country of destination. Materials used must also destroy/inactivate chemicals deposited on the surface of the material such as aflatoxin resulting from past microbial/fungal growth.

Two materials have been evaluated for their innate feasibility for use as aeration floors—corrugated cardboard and corrugated plastic. Both have been found to be suitable. However, cardboard represents a wood-based product and as such its use in international shipments may be regulated and limited to a singly use unless it is independently re-sterilized between uses.

In corrugated material, the longitudinal chambers formed during manufacturing are used as a de facto plenum. By systematically creating a series of holes the length of a single channel and across the width of the channels, a network of holes is created which represents a plenum with controlled air release across the surface layer. Air release is based upon static pressure and hole size, both of which can be regulated.

This plenum may be laid directly on the floor of the intermodal containers. Alternatively, it may be inserted inside of a plastic liner which may be inserted into the intermodal container to separate the material being shipped from the materials used in the construction of the intermodal container and/or undefined (surface and/or absorbed) contaminants which may be present in the intermodal container.

Examples of products which may be stored/transported:
Beans including soybeans, Mung, Black, Navy, White, etc.;
Tree/bush seeds such as walnut, hazelnut, pecans, coffee, etc.;
Grains such as Amaranth, Barley, Buckwheat, Bulger, Corn, Einkorn, Faro, Flax, Fonio, Freekeh, Jojoba, Kamet, Kania, Linseed, Lentils, Oats, Poppy Seeds, Pulses, Quinoa, Rice, Rye, Sesame, Sorghum, Spelt, Taro, Tuff, Triticale, Wheat, Wild Rice, Safflower, Sunflower, etc.; and Seeds from grasses used in horticulture, food and feed.

An ideal treatment for dealing with insects, undesirable microbes and surface contaminants may be the use of ozone which is generally recognized as safe (GRAS) relative to food safety and is effective against surface microbes, fungi, and insects. Ozone is a particularly potent treatment effective on insects, fungi, bacteria, viruses, etc. In addition, ozone is known to destroy many kinds of surface contaminants left by bacterial, fungi, etc. By effectively sterilizing the surface of grain and killing insects, the process can broaden the window for safe storage when storage conditions are adverse. However, there are many options available to address specific issues. Ozone is relatively unique in that one must reach a threshold level in the grain and then maintain that level for a finite period of time. What makes ozone (and other ionized agents) is that it naturally degrades spontaneously over time by reacting with itself, and via interaction with contaminants in the material being tested. Hence, its concentration must be monitored and replenished as required so as to maintain the required concentration over time requirement.

The recent finding that the African Swine Fever (ASF) virus could be transmitted in feed and feed ingredients has created a specific need. Since ozone is known to inactivate viruses, the treatment of food/feed ingredients and/or feed per se during transport may represent an effective application of this technology.

To monitor the movement of air, gasses and/or volatile chemicals through the material bed, it may be necessary to place appropriate sensors within the plenum leading to the aeration floor in the "dead air" space above the grain or within the vertical material mass being treated. These sensor systems can monitor air flow, ambient air temperature, plenum air temperature, ambient air humidity, plenum air humidity, grain temperature, grain moisture, static air pressure in the plenum, ozone level in the plenum, ozone level in the top space, oxygen, carbon dioxide, etc. Depending upon the prescribed treatment conditions, it may be necessary to measure parameters at various levels and positions within the stored material. A small container can be magnetically attached to the intermodal container's top/bottom/sides to attach sensors/sensor cables to keep the sensors positioned appropriately within the container. The box may be physically linked to a monitoring system by a wire or linked via a Rf system using either proprietary or standardized encoding systems.

The objectives can easily be accomplished by ozonation. Ozone is an unstable molecule and naturally self-destructs over time by reacting with itself and via interaction with contaminants in the material being tested. Hence, its concentration must be monitored and replenished as required to maintain the required concentration over time. The rate of ozone destruction can be accelerated by using known catalysts. An ozone destruction system can be added to the discharge port of the aeration system. The African Swine Flu is known to be susceptible to ozone destruction.

The approach may be adapted to containers smaller that ISO standard intermodal container such as Intermediate Bulk Containers by inserting a scaled down aeration floor in the bottom of the smaller container prior to filling and attaching it to the aeration system. Smaller containers may be constructed as either hard-sided containers or as fabric or equivalent) bags. Alternatively, porous bags may be placed in an intermodal container with treatment proceeding by diffusion of conditioned air into the bagged contents.

Because intermodal containers are gasketed, they may be considered as hermetic storage, which when combined with a aeration floor/system provides enhanced product storage. Because the hermetic aspects are constrained by changes in atmospheric pressure and temperature related changes internally. The aeration system may be linked to a vent system designed to create a barrier to the ingress of volatile chemicals, microbes, animals, dusts, etc. Alternatively, a flexible bladder may be installed in the dead air space of the intermodal container and linked to the exterior so as to control internal air pressure.

Hermetic storage can be enhanced by using a modified atmosphere such as reduced oxygen and/or elevated carbon dioxide. This atmosphere can be created artificially or naturally. One natural approach to creating a low oxygen environment is to use small quantities of soaked grains (i.e. germinating or fermenting) to convert oxygen to carbon dioxide within the container.

A condition for acquiring intermodal containers from third parties is that the container is returned to the rental pool in an "as new" condition with no tape, nails, screws, fittings, etc. or similar accouterments left in the container. This means that an aeration floor and its supporting components must be totally removable (and ideally reusable).

Turning now to the figures. FIG. 1 illustrates a known intermodal container 100 utilized for shipping granular material such as grains, beans, and other seeds. The intermodal container 100 has sides 102 about the periphery of the container 100. One end of the intermodal container 100 has hinged doors 104 permitting access to an interior of the intermodal container 100. An opposite end of the intermodal container 100 can include a lower hatch (not shown) to permit the discharge of the container 100 contents in a controlled manner. A top 120 is supported by the sides 102 and has a plurality of fill ports 122 spaced along a length thereof. The fill ports 122 can be opened to permit filling the intermodal container 100 with the granular material desiring to be shipped. Note: In general, containers 100 typically have a pair of inspection ports at the top of the main rear doors 104 to allow sampling and physical inspection of the contents of container 100. Another pair of drain doors (not shown) are located at the bottom of doors 104 to remove excess product from the container 100. Containers 100 also have a full width unload door at the bottom, front of the container (end opposite doors 104) to enable the controlled release of the product in container 100.

Figure 2:
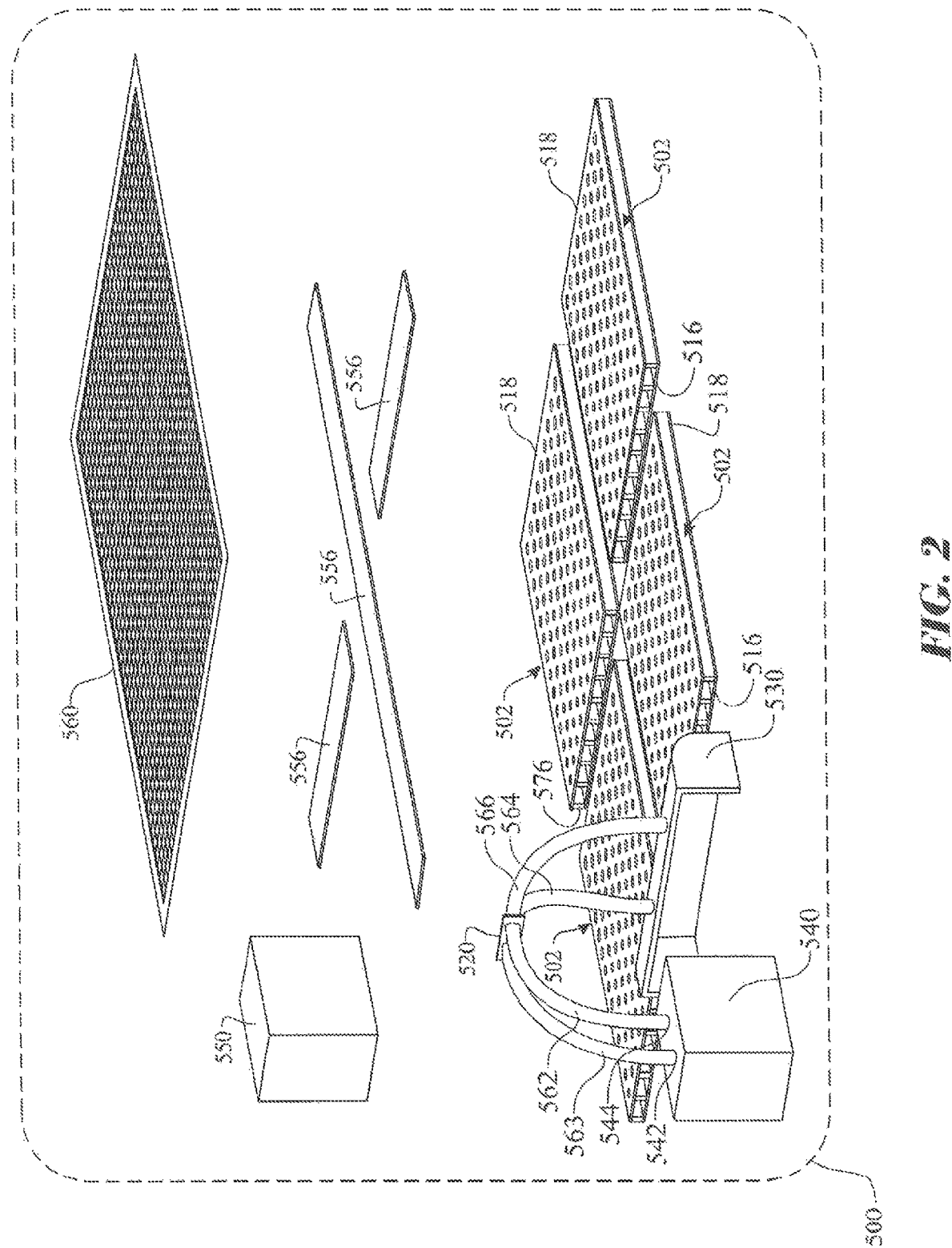
FIG. 2 presents a segmented isometric view of an aeration floor panel used in the preferred embodiment.
Figure 3:
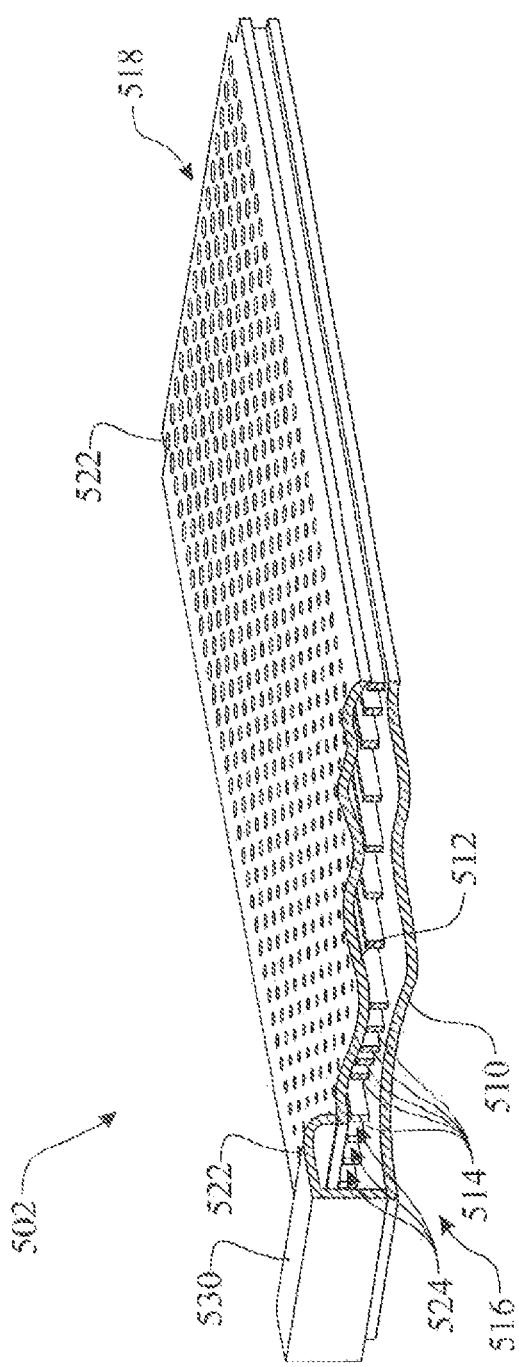
FIG. 3 presents an isometric view of an intermodal container kit for temporary modification of an intermodal container according to the preferred embodiment.
Figure 4:
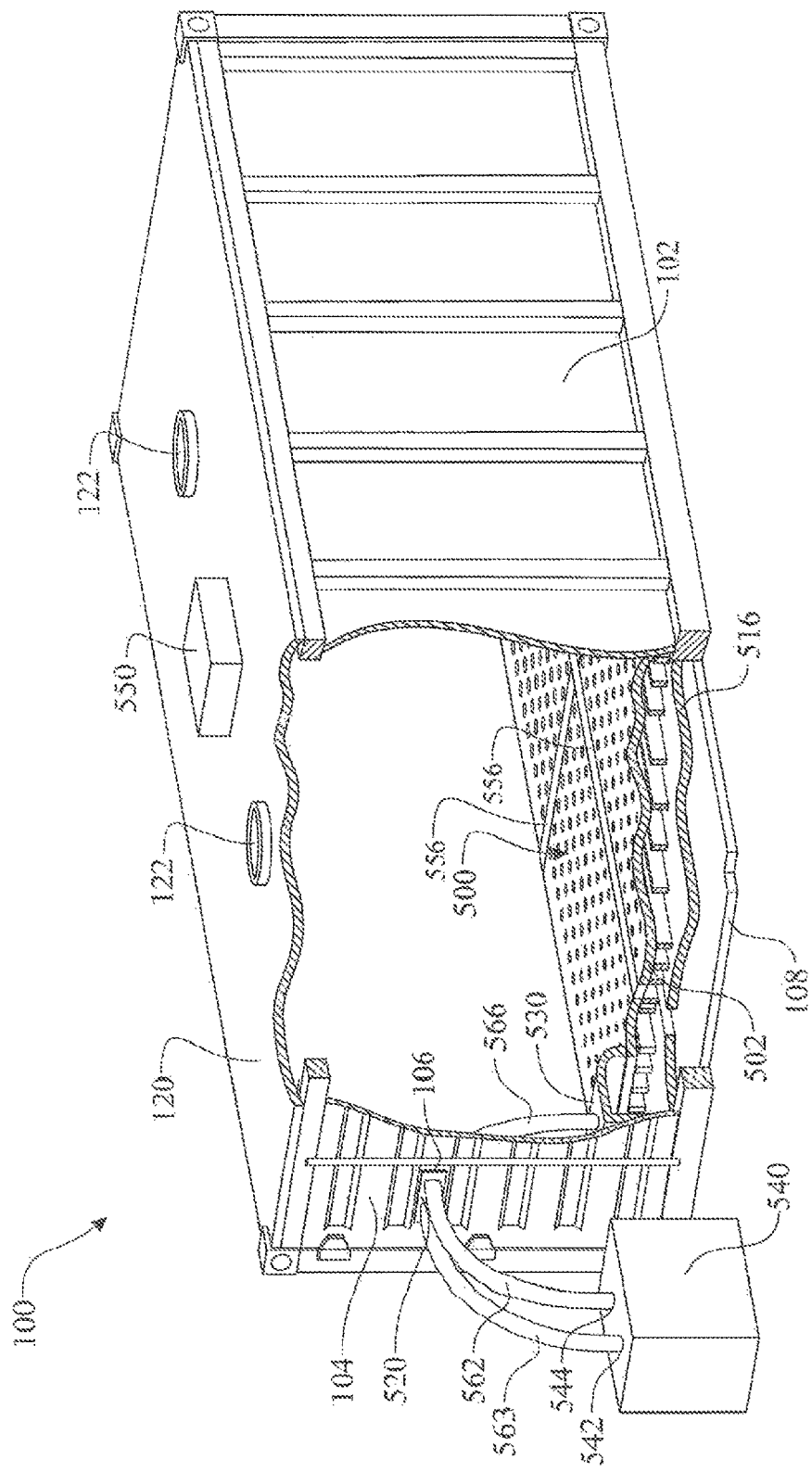
FIG. 4 presents an isometric view of an intermodal container modified with the kit of FIG. 3.

In one exemplary implementation of the invention as illustrated in FIGS. 2-4, an aeration floor modification kit 500 according to the present invention is shown for temporarily modifying an intermodal container 100 for the uniform distribution of air or a chemical gas for the treatment of the granular material being shipped in the intermodal container 100. The installation of the kit 500 permits an intermodal container 100 to be utilized for both storage and transport of grains and similar products.

Referring now to FIG. 2, the components of the aeration floor kit 500 for installation in an intermodal container 100 are illustrated. The kit 500 generally comprises a plurality of components for the purpose of directing a fluidic gas through the bulk materials in the container 100.

The kit 500 includes a plurality of aeration floor panels 502 sized such that preferably four or more panels 502 when placed adjacent one to the others substantially cover a floor 108 of an intermodal container 100. The configuration of the aeration floor panels 502 is most clearly seen in FIG. 3 wherein the floor panel 502 is constructed of an extruded resin and takes the form of a lower planar sheet 510 and an upper planar sheet 512. Planar sheets 510, 512 are vertically separated by a plurality of vertical webs 514 substantially equally spaced across the width of the floor panel 502 and extend longitudinally from a proximate end 516 to a distal end 518. The planar sheets 510, 512 in combination with the plurality of vertical webs 514 define a plurality of longitudinally extending air channels 524 interiorly of aeration floor panel 502. The upper planar sheet 512 defines a plurality of apertures 522 along and communicating with each of the air channels 524. The apertures 522 vary in diameter from smallest at the proximal end 516 to largest at the distal end 518.

Lengths of tape 556 are provided for sealing the mating joint interfaces of adjacent floor panels 502 for the prevention of bulk materials invading through the joint interface. Alternatively, floor panels 502 may be manufactured with lips which overlap adjacent panels 502 to create an airtight seal. A porous fabric blanket 560 is provided for use with small diameter grains/seeds to prevent the bulk material from entering the air channels 524. The size, number, and shape of the apertures 522 may be adjusted to preclude the blockage of the apertures 522.

A gas distribution apparatus 540 can be an ozone generator or distributor of other preservative chemically enriched gases as well as temperature controlled air for moisture removal and/or rehydration for optimal storage. The gas distribution apparatus 540 includes at least an inlet port 542 and an exhaust port 544 for the recirculation of preservative gases. Inlet conduits 562 and 563 extend from ports 542 and 544 to an adapter plate 520 and distribution conduits 564 and 566 extend from the adapter plate 520 to the plenum interface 530. The adapter plate 520 is sized to fit an inspection port in door 104 of the container 100.

A sensor unit 550 is sized for installation at one of the fill ports 122 at the top of the intermodal container 100 and includes one or more sensors for determining the moisture content, temperature, carbon dioxide levels, and other characteristics that may be detrimental to the preservation of the bulk contents of the intermodal container 100.

In use, and as shown in FIG. 4, a standard intermodal container 100 is prepared to accept bulk materials by the addition of aeration floor modification kit 500. The aeration floor panels 502 are arranged and placed on the floor 108 of the container 100. Optionally, a waterproof tarp (not shown) can initially be placed on the floor 108 and the floor panels 502 placed on top of the tarp. The distal ends of the floor panels 502 most distal from the container doors 104 are sealed either with an adhesive tape or a sealant. The mating joints of adjacent floor panels 502 are then taped to prevent bulk materials from entering the plenum area defined by the floor panels 502. The plenum interface 530 is placed at the most proximal ends of the floor panels 502 such that the interior of the plenum interface 530 is gaseously communicative with the individual air channels 524 defined by the floor panels 502. The adapter plate 520 is installed at an inspection port of door 104 and delivery conduits 564 and 566 are connected to the plenum interface 530 and the adapter plate 520. Inlet conduits 562 and 563 are connected to the gas distribution apparatus 540 and adapter plate 520 respectively. The sensor unit is installed at one of the fill ports 122 of container 100 with one or more sensors (not shown) optimally placed to measure characteristics of the bulk material. (Note: Some food processors will probably require the use of a plastic bag liner within a container to further reduce the risk of residual chemicals in a re-used container 100. This is a carry-over of the use of general purpose intermodal containers which have treated wood floors as opposed to steel floor in bulk containers 100. These containers will frequently have permanent hooks in the ceiling to be used to hang isolation bags.)

The container 100 is then filled with a predetermined weight of bulk material such as agricultural grain, seeds, or beans. These materials are susceptible to quality degradation if not maintained at a correct moisture content. If the moisture content is too high, the material may become moldy and thus unusable at worst and at best severely degraded in value. The gas distribution apparatus 540 can be an ozone generator or other distributor of preservative gases. The sensor system 550 can be attached to the upper portion of the intermodal container 100 at one of the fill ports 122 or to one of the panels container sides 102. The sensor system 550 monitors such parameters as airflow, ambient air temperature, plenum air temperature, ambient air humidity, plenum air humidity, green temperature, green moisture, static air pressure in the plenum, ozone level in the plenum, ozone level in the top space, oxygen, carbon dioxide.

The gas distribution apparatus 540 can be powered by electricity or by a fossil fuel burning engine (not shown). The gaseous air or other chemically enriched gas enters the aeration floor panel 502 at each of the air channels 524 at the proximal end 516 of the panel 502. The airflow along each air channel 524 results in a pressure drop from proximal end 516 to distal and 518 as a result of natural flow dynamics. Therefore, the gas distribution transmitted through apertures 522 would not be uniform if the apertures 522 were of uniform cross-sectional area. Thus, to compensate for this loss, the apertures 522 become progressively larger in cross-sectional area from aperture 522 at the proximal end 516 to aperture 522 at the distal end 518. Further, the distal end 518 most distant from the plenum interface 530 is sealed to prevent gas from escaping from the end of the floor panel 502.

A plenum interface 530 is positioned at a bottom of the intermodal container 100 and extends from the proximal end 516 of the aeration floor panel 502 to the doors 104 of the intermodal container 100. The plenum interface 530 is gaseously communicative with each of the air channels 524 at proximal end 516 of the floor panel 502 most proximate to the doors 104.

The gas delivery apparatus 540 is exterior to the intermodal container 100, and can comprise a single gas delivery unit such as an ozone generator, or alternatively, the gas delivery apparatus 540 can be comprised of a plurality of units such as a plurality of ozone generators and a separate fan house therein (not shown). The units housed therein can be configured to deliver one or more of the gaseous protectants including, but are not limited to—propylene oxide, propylene chlorohydrin, propylene bromohydrin, hydrogen cyanide, sulfuryl fluoride, chlorpyrifos-methyl, deltamethrin, diacon II [(s-methoprene)], pirimiphos-methyl, pyrethrins, piperonyl butoxide, malathion, methyl bromide, phosphine.

Once the intermodal container 100 has the aeration kit 500 installed therein, the container 100 is then filled with a predetermined weight of bulk material such as agricultural grain, seeds, or beans. These materials are susceptible to quality degradation if not maintained at a correct moisture content. If the moisture content is too high, the material may become moldy and thus unusable at worst and at best severely degraded in value. If the grain size is too small and has the potential to clog the apertures 522, a porous blanket 560 can be laid over the top of the floor panel 502 to prevent individual pieces of grain from lodging in and thereby blocking the apertures 520, 522.

In operation, a gas delivery unit in the gas delivery apparatus 540 begins flowing one of the gaseous protectants through exhaust port 544 into first delivery conduit 564 and the second delivery conduit 566 into plenum 530. The gaseous protectant then disperses along the length of plenum interface 530 and enters the individual air channels 524 of the aeration floor panel 502. The gaseous protectant then flows down the individual air channels 524 and disperses into the bulk material through apertures 522. The gaseous protectant then rises through the bulk material to the upper portion of the intermodal container 100 and is then returned to inlet 542 of the gas delivery apparatus 540 through inlet conduit 562. The aeration system 500 then continually recycles the mass of gaseous protectant through the bulk material.

The installation and functional operation of the floor aeration kit 500 permits the intermodal container 100 to be loaded at a source such as at a grower's field and then operate to dry and preserve the bulk contents throughout the transport and storage phases until the intermodal container 100 reaches a destination for unloading. To unload the container 100, the process above is reversed. The bulk material is removed from the container and the aeration floor kit 500 is removed from the container 100. The container 100 can then be repurposed to transport other materials without the need to transport an empty container to a bulk material source for further use. The individual components of multiple aeration floor kits 500 can be loaded into a single intermodal container 100 and returned to the source of the bulk material for installation on unmodified intermodal containers 100. Thus, the use of the aeration floor kits 500 optimize the utility of the intermodal containers without the need for excessive shipment of empty containers.

Alternatively, porous bags (not shown) may be placed in an intermodal container with treatment proceeding by diffusion of conditioned air into the bagged contents.

An electronically controlled fan which provides the desired air flow to the plenum or pulls the desired air flow from the exhaust port.

A corrugated section design for the base plenum which uses selvage edges of mating panels to provide airtight seals between adjoining panels. The end of the panel may be sealed with tape or injectable material or heat sealed.

An electronic management system which controls the flow of air through the intermodal container based upon sensor data to perform operations such as drying, rehydration, ozonation, etc.

The ability to speed drying (i.e., moisture removal) of material being stored in the container may be enhanced by the controlled delivery of heat to the air being pushed into the plenum by the fan. This heat may be derived from heaters powered by electricity fossil fuels, solar collectors, ground/water source systems, etc. Similarly, it may be useful to cool the air in warm environments.

These embodiments can utilize other types of "cold plasma" treatment approaches in addition to ozone. Cold plasma is typically produced using electricity and a carrier gas or gas mixture such as air, oxygen, nitrogen, helium, etc. This approach may be useful with much wider types of agricultural crops including tree nuts, dried fruit, herbs, ground nuts, etc.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What I claim is:

1. A kit for temporarily modifying an intermodal container for aerating an interior thereof with a fluidic gas to maintain quality characteristics of bulk material contents in the intermodal container, the kit comprising:

A plurality of aeration floor panels sized to cover a floor of the container when placed adjacent one to the others, each panel defining a plurality of apertures therethrough for placement upon the floor of the intermodal container, each aeration floor panel defining a plurality of longitudinally extending air channels therealong collectively defining a plenum, the apertures facilitating transfer of the fluidic gas from the air channels through the apertures to the interior of the intermodal container;

a plenum interface in fluidic communication with the plenum defined by the aeration floor panels; and a gas delivery apparatus having an inlet for the intake of a fluidic gas and having an outlet gaseously communicative with the plenum interface for delivering the fluidic gas to the aeration floor panel air channels.

2. The intermodal container aeration kit according to claim 1 wherein the aeration floor panel is a corrugated panel having two outer sheet layers separated by a central corrugated layer.

3. The intermodal container aeration kit according to claim 1 wherein the aeration floor panel comprises an extruded resin panel forming two outer sheets separated by a plurality of parallel webs extending longitudinally along the length of the panel, the outer sheets in combination with the parallel webs defining the plurality of air channels, the extruded panel further defining a plurality of linearly aligned apertures through one of the outer sheet layers and aligned along each of the air channels.

4. The intermodal container aeration kit according to claim 1 wherein the apertures at a first end of the aeration floor panel have a smaller cross-sectional area than the apertures most distal from the first end of the plenum interface.

5. The intermodal container aeration kit according to claim 4 wherein the apertures variably increase in cross-sectional area from the aperture most proximate to the first end of the aeration floor panel to the aperture most distal from the first end.

6. The intermodal container aeration kit according to claim 1 wherein the gas delivery apparatus is adapted for installation at an inspection port of the intermodal container and the inlet of the gas delivery apparatus is communicative with a top portion of the intermodal container and the exhaust of the gas delivery apparatus is communicative with the plenum interface.

7. The intermodal container aeration kit according to claim 1 wherein the gas delivery apparatus includes at least one ozone generator.

8. The intermodal container aeration kit according to claim 1 further including a sensor system for monitoring quality characteristics of bulk contents of the intermodal container.

9. The intermodal container aeration kit according to claim 8 wherein the sensor system is functional to monitor at least one of the quality characteristics group consisting of airflow, ambient air temperature, plenum air temperature, ambient air humidity, plenum air humidity, green temperature, green moisture, static air pressure in the plenum, ozone level in the plenum, ozone level in the top space, oxygen, and carbon dioxide.

10. The intermodal container aeration kit according to claim 1 further including a porous blanket covering the upper surface of the aeration floor panels to prevent portions of a bulk content of the intermodal container from blocking the aeration floor panel apertures.

11. The intermodal container aeration kit according to claim 1 wherein the fluidic gas delivered through the aeration floor panels is one of the gasses selected from a group consisting of ozone, propylene oxide, propylene chlorohydrin, propylene bromohydrin, hydrogen cyanide, sulfuryl fluoride, chlorpyrifos-methyl, deltamethrin, diacon II [(s-methoprene)], pirimiphos-methyl, pyrethrins, piperonyl butoxide, malathion, methyl bromide, phosphine.

12. The aeration system according to claim 1 further including a sensor system for monitoring quality characteristics of bulk contents of the intermodal container, the quality characteristics being at least one of the group consisting of airflow, ambient air temperature, plenum air temperature, ambient air humidity, plenum air humidity, green temperature, green moisture, static air pressure in the plenum, ozone level in the Plenum, ozone level in the top space, oxygen, carbon dioxide.

13. A method for temporarily modifying an intermodal container for the shipment of bulk materials comprises the steps of:
    acquiring a modification kit comprising a plurality of aeration floor panels, each panel defining a plurality of longitudinal air channels therealong wherein a top surface of each floor panel defines a plurality of apertures through an upper surface of the floor panel for gaseous communication from the air channel therethrough, a plenum interface, a gas distribution apparatus, an adapter plate having gas delivery conduits extending therethrough, and a sensor system for monitoring quality characteristics of bulk contents of the intermodal container;
    placing the aeration floor panels on the floor of the intermodal container abutting one to the others;
    applying adhesive tape over the joints of abutting floor panels;
    placing the plenum interface at an end of the aeration floor panels most proximal to doors at one end of the intermodal container;
    installing the adapter plate at an inspection port of a container door;
    connecting one end of the gas delivery conduits to the plenum interface and an opposite end of the gas delivery conduits to the gas distribution apparatus;
    installing the sensor system to a fill port at the top of the container;
    filling the container with a bulk material;
    monitoring the quality characteristics of the bulk contents during container transport and storage;
    emptying the container of the bulk material; and
    removing the modification kit from the intermodal container.

14. The method for temporarily modifying an intermodal container according to claim 13 further including after the removing the modification kit step, the steps of:
    returning the intermodal container to general use; and
    returning the modification kit to the source of the bulk material for installation in a subsequent intermodal container.

15. The method for temporarily modifying an intermodal container according to claim 13 further including after the removing the modification kit step, the steps of:
    placing a plurality of modification kits in an intermodal container; and
    returning the intermodal container containing the plurality of modification kits back to the bulk material source for reuse in modifying subsequent intermodal containers.

16. A system for aerating an interior of an intermodal container with a fluidic gas to maintain quality characteristics of bulk material contents in the intermodal container, the system comprising:
    a plurality of aeration floor panels defining a plurality of apertures therethrough and removably supported upon the floor of the intermodal container, the aeration floor panels defining a plurality of longitudinally extending air channels therealong, the apertures facilitating transfer of the fluidic gas from the air channels to the interior of the intermodal container;
    a plenum interface located at one end of the intermodal container, the plenum interface in fluidic communication with the air channels at a proximal end of the aeration floor; and
    a gas delivery apparatus external to the intermodal container, the gas delivery apparatus having an inlet for the intake of a fluidic gas from the top interior of the intermodal container and having an outlet gaseously communicative with the plenum interface for delivering the fluidic gas to the aeration floor panels.

17. The aeration system according to claim 16 wherein the aeration floor panels each comprises an extruded resin panel forming two outer sheets separated by a plurality of parallel webs extending longitudinally along the length of the panel, the outer sheets in combination with the parallel webs defining the plurality of air channels, the extruded panel further defining a plurality of linearly aligned apertures through one of the outer sheet layers and aligned along each of the air channels.

18. The aeration system according to claim 17 wherein the apertures most proximate to the plenum interface have a smaller cross-sectional area than the apertures most distal from the plenum interface.

19. The aeration system according to claim 18 wherein the apertures variably increase in cross-sectional area from the aperture most proximate to the plenum interface to the aperture most distal from the plenum interface.

20. The aeration system according to claim 16 wherein the gas delivery apparatus includes at least one ozone generator.

* * * * *